Jan. 17, 1956   P. W. BERROWS   2,731,112
BRAKES FOR VEHICLES
Filed Sept. 23, 1952   2 Sheets-Sheet 1

INVENTOR
PERCIVAL WALTER BERROWS
by Walter S. Pleston
ATTORNEY

Jan. 17, 1956  P. W. BERROWS  2,731,112
BRAKES FOR VEHICLES
Filed Sept. 23, 1952  2 Sheets-Sheet 2

INVENTOR
PERCIVAL WALTER BERROWS
by Walter S Pleston
ATTORNEY

United States Patent Office 2,731,112
Patented Jan. 17, 1956

2,731,112

BRAKES FOR VEHICLES

Percival Walter Berrows, Birmingham, England, assignor to Girling Limited, Birmingham, England, a British company Application September 23, 1952, Serial No. 311,004

6 Claims. (Cl. 188—72)

This invention relates to improvements in vehicle brakes of the type in which two axially aligned pads or blocks of friction material are adapted to be urged into engagement with opposite faces of a disc mounted on and rotating with a wheel, shaft, or other part to be braked, the friction pads or blocks being mounted in a housing which is positively held against angular movement.

According to my invention the friction pads are mounted in co-axial bores in a housing which straddles the outer part of the brake disc and is mounted to rock about a fixed axis at right angles to that of the disc, and one pad is engaged by a part rigidly associated with the housing and the other pad is slidable in its bore and is engaged by a lever which is mounted to rock about a pivot on the housing and is adapted for connection by a rod or cable to a pedal, lever, or other operating member.

When the pedal or lever is operated to rock the lever about its pivot the lever urges the one pad or block against the disc and the reaction on the housing urges the other pad or block against the opposite face of the disc, the housing being free to rock about its axis so that the pressures exerted by the pads or blocks on the disc are balanced.

Means are provided for adjusting the abutments between the pads or blocks and the lever and housing to take up wear of the pads or blocks, and means may also be provided for maintaining the pads or blocks in light rubbing contact with the disc when the brake is in the off position or alternatively for holding the pads or blocks out of engagement with the disc.

The brake may be applied to a disc associated with a wheel of a vehicle but it is particularly suitable for use as a parking brake associated with a part of the vehicle transmission. The disc may, for example, be mounted on the cardan shaft or on the rear half of the universal joint immediately in front of the rear axle casing, or a disc may be mounted at the inner end of one or each half-shaft in a vehicle having independently sprung rear wheels.

One practical form of parking brake in accordance with the invention is illustrated by way of example in the accompanying drawings in which.

Figure 1:
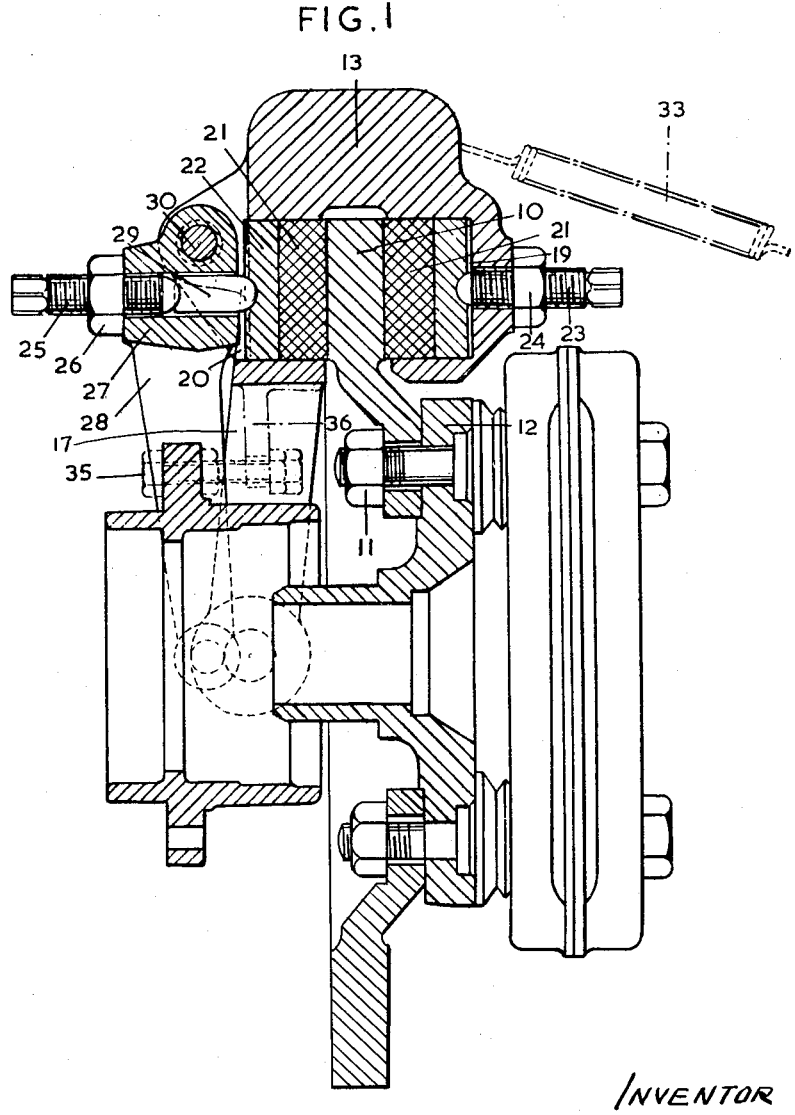
Figure 1 is a section of the brake in a vertical plane containing the axis of the brake disc.
Figure 2:
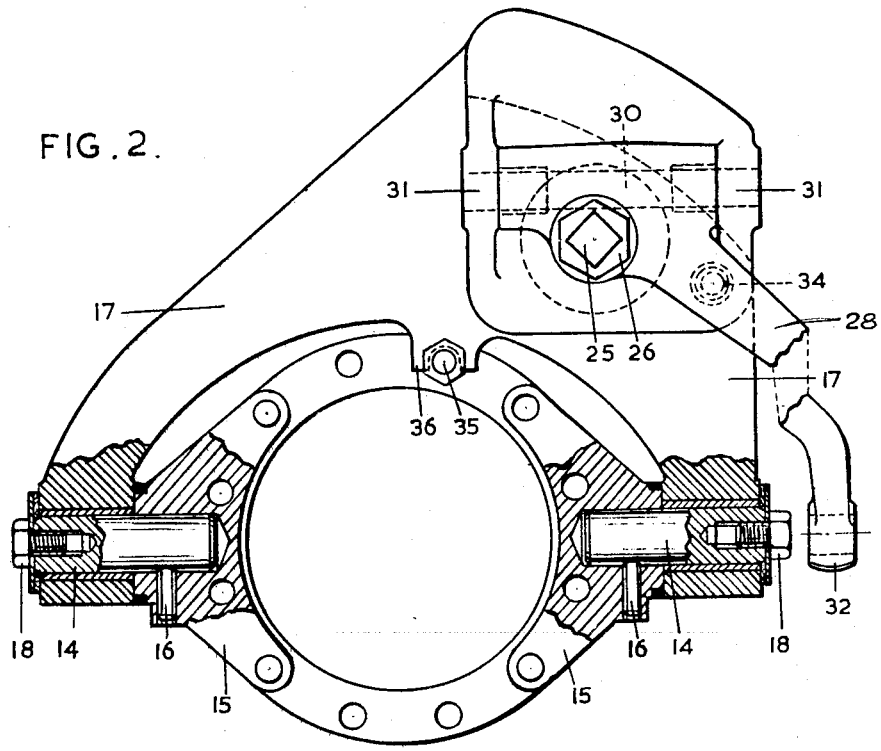
Figure 2 is an end elevation of the brake with the bearings of the brake housing in section.

In the drawings 10 is the brake disc of which the central part is dished and is secured by bolts 11 to a ring 12 forming part of a universal joint in the transmission shaft of the vehicle.

The disc is straddled at one point by a rigid brake housing 13 of the outline shown in the drawings which is mounted to rock in trunnion bearings about an axis intersecting the axis of the disc at right angles. Each trunnion bearing comprises a pin 14 of which the inner end is received in a radial bore in a lug or bracket on a ring 15 secured to or forming part of the axle casing adjacent to the disc. The pin is fixed in the bore by a set-pin or peg 16 engaging in a groove in the pin. The outer ends of the pin 14 are rotatably mounted in oil-less or other bushings in aligned bores in curved arms 17 which are integral with and depend from the housing 13 on each side of the ring 15. Studs 18 are screwed into the outer ends of the pins 14 and carry washers engaging the outer ends of the arms 17.

In the part of the housing which straddles the disc there are two co-axial bores 19, 20, the rear bore 19 being closed at its outer end and the other bore 20 being open. A pad member of friction material 21 adapted to engage the surface of the disc is located in each bore and is backed by a steel disc 22. A stud 23 adjustably screwed through the closed end of the bore 19 and provided with a lock-nut 24 bears on the disc 22, the inner end of the stud which is rounded engaging in a complementary recess in the disc.

The backing disc 22 in the other bore is engaged by a similar stud 25 provided with a lock-nut 26 and screwed through a lug 27 on a lever 28. The inner end of the stud may engage directly with the disc 22 or an intermediate tappet 29 may be interposed as shown in Figure 1. The lever is mounted to rock about a pin 30 between two spaced lugs 31 on the housing, the axis of the pin being parallel to and spaced radially from the axis of the trunnion bearings of the housing.

Each pad member 21 and the backing disc 22 in contact therewith together constitute a pad shiftable into engagement with the brake disc.

The lever which extends downwardly is cranked to clear the rest of the mechanism and terminates in an eye 32 which is adapted to be connected to an operating rod or cable and which is substantially in alignment with the axis of the trunnion bearings of the housing.

When a pull is applied to the lever it is rocked about the pin 30 on the housing and the stud 25, through the tappet 29, urges the pad in the bore 20 against the disc. The reaction of the lever on the housing rocks the housing about its pivotal axis to urge the other pad against the opposite face of the disc, and as the housing is free to rock about its trunnion bearings the pressures exerted by the two pads are balanced and there is no axial thrust on the disc in either direction. The torque on the housing is taken through the trunnion bearings by the ring 15.

When the pads wear the brake can be adjusted very rapidly and easily by slackening off the lock-nuts on the studs 23 and 25 and screwing in the studs of which the outer ends are squared or otherwise formed for engagement by a spanner or key.

In the off position of the brake the pads may be held out of engagement with the disc by the means shown in the drawings. A pull-off spring 33 attached to the housing adjacent to its outer end normally rocks the housing over on its trunnions against a stop formed by a bolt 35 adjustably mounted in the ring 15 and co-operating with a forked lug 36 on the housing to hold the pad in the bore 19 clear of the disc. A spring 34 mounted in a recess in the lever on the inner side of its pivot bears against the adjacent face of the housing and relieves any pressure on the other pad.

In an alternative arrangement means may be provided to maintain the brake pads in light rubbing contact with the disc in the off position of the brake.

I claim:

1. A brake of the kind specified comprising a brake disc including an outer part and having opposed parallel faces, a housing which straddles the outer part of the brake disc and is mounted to rock about a stationary axis which intersects the axis of the disc at right angles, said housing having axially aligned bores, friction pads mounted in each of said bores for engagement with said opposite faces of said disc, a part rigid with the housing and bearing on one of said pads, and a lever mounted to rock about a pivot on the housing and bearing on the other of said pads.

2. A disc brake as in claim 1 wherein the pivot on the housing about which said lever rocks is parallel to and spaced radially from the axis about which the housing is mounted to rock.

3. A disc brake as in claim 1 wherein means are provided for holding the friction pads out of engagement with the brake disc in the off position of the brake.

4. A disc brake as in claim 1 further comprising a pull-off spring connected to the housing, an adjustable stop against which the housing is held by said spring in the off position of the brake, and a spring interposed between said lever and said housing.

5. A brake of the kind specified comprising a brake disc rotatable about an axis and having opposed parallel faces, a housing adapted to straddle the outer part of the brake disc, spaced trunnion bearings about which said housing is angularly movable, the axis of said bearings being at right angles to that of the disc, axially aligned bores in said housing, the first one of said bores being closed at its outer end and the second one of said bores being open at its outer end, friction pads slidably mounted in said bores for engagement with opposite faces of said disc, a member adjustably screwed through the closed end of the first bore and bearing on the pad in said bore, a lever pivotally mounted on said housing, a member adjustably screwed through one end of said lever and bearing on the pad in the second bore, and means at the other end of said lever for connection to an operating means.

6. A disc brake as in claim 5 wherein the means at the end of the lever for connection to an operating means are in alignment with the axis of the trunnion bearings about which the housing is mounted to rock.

References Cited in the file of this patent

UNITED STATES PATENTS

| | | |
|---|---|---|
| 1,940,845 | Conner et al. | Dec. 26, 1933 |
| 1,978,974 | Williams | Oct. 30, 1934 |
| 2,060,878 | LaBrie | Nov. 17, 1936 |
| 2,575,578 | Bricker | Nov. 20, 1951 |
| 2,614,662 | Hawley | Oct. 21, 1952 |